US010401536B2

(12) United States Patent
Chiarotto et al.

(10) Patent No.: US 10,401,536 B2
(45) Date of Patent: Sep. 3, 2019

(54) ITEM COATED WITH A SILICON/ORGANIC LAYER IMPROVING THE PERFORMANCES OF AN OUTER COATING

(71) Applicant: ESSILOR INTERNATIONAL (COMPAGNIE GENERALE D'OPTIQUE), Charenton-le-Pont (FR)

(72) Inventors: Sebastien Chiarotto, Charenton-le-Pont (FR); Bruce Faure, Charenton-le-Pont (FR); Stephanie Pega, Charenton-le-Pont (FR); Karin Scherer, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 293 days.

(21) Appl. No.: 14/898,425

(22) PCT Filed: Jun. 13, 2014

(86) PCT No.: PCT/FR2014/051463
§ 371 (c)(1),
(2) Date: Dec. 14, 2015

(87) PCT Pub. No.: WO2014/199103
PCT Pub. Date: Dec. 18, 2014

(65) Prior Publication Data
US 2016/0139304 A1 May 19, 2016

(30) Foreign Application Priority Data
Jun. 14, 2013 (FR) ..................... 13 55604

(51) Int. Cl.
G02B 1/18 (2015.01)
G02B 1/115 (2015.01)
C03C 17/00 (2006.01)
C03C 17/42 (2006.01)
G02B 1/10 (2015.01)
G02B 1/111 (2015.01)
G02C 7/02 (2006.01)

(52) U.S. Cl.
CPC .............. *G02B 1/18* (2015.01); *C03C 17/001* (2013.01); *C03C 17/009* (2013.01); *C03C 17/42* (2013.01); *G02B 1/105* (2013.01); *G02B 1/111* (2013.01); *G02B 1/115* (2013.01); *G02C 7/022* (2013.01); *C03C 2217/734* (2013.01); *C03C 2217/76* (2013.01); *C03C 2217/948* (2013.01); *G02C 2202/16* (2013.01)

(58) Field of Classification Search
CPC .............. G02B 1/18; G02B 1/111; G02B 1/11
See application file for complete search history.

(56) References Cited

U.S. PATENT DOCUMENTS

| 5,618,619 | A | 4/1997 | Petrmichl et al. |
| 5,888,593 | A * | 3/1999 | Petrmichl ........... C23C 16/0245 204/192.35 |
| 6,472,017 | B2 * | 10/2002 | Veerasamy ............ B05D 5/083 427/249.7 |
| 6,663,753 | B2 * | 12/2003 | Veerasamy ............ B05D 5/083 204/192.11 |
| 6,919,134 | B2 | 7/2005 | Mitsuishi et al. |
| 2002/0192371 | A1 * | 12/2002 | Veerasamy ............ B05D 5/083 427/249.7 |
| 2003/0198818 | A1 | 10/2003 | Mitsuishi et al. |
| 2004/0157061 | A1 | 8/2004 | Ichimura |
| 2007/0188871 | A1 * | 8/2007 | Fleury ............... B32B 17/10036 359/586 |
| 2010/0003508 | A1 | 1/2010 | Arrouy et al. |
| 2010/0200541 | A1 | 8/2010 | Habassi et al. |
| 2012/0013845 | A1 | 1/2012 | Conte et al. |

FOREIGN PATENT DOCUMENTS

| EP | 1857504 | 11/2007 |
| JP | H05323103 | 12/1993 |
| JP | H06-138305 | 5/1994 |
| JP | 2001-335920 | 12/2001 |
| JP | 2003-202407 | 7/2003 |
| JP | 2003-255107 | 9/2003 |
| JP | 2004-013127 | 1/2004 |
| JP | 2004-198445 | 7/2004 |
| JP | 2006-39239 | 2/2006 |
| JP | 2006-171204 | 6/2006 |
| JP | 2006-249302 | 9/2006 |
| JP | 2007078780 | 3/2007 |
| JP | 2008-080704 | 4/2008 |
| JP | 2008-152085 | 7/2008 |
| JP | 2009-175500 | 8/2009 |

(Continued)

OTHER PUBLICATIONS

Office Action issued in Corresponding Japanese Patent Application No. 2016-518574, dated Apr. 3, 2018.

(Continued)

*Primary Examiner* — Margaret G Moore
(74) *Attorney, Agent, or Firm* — Norton Rose Fulbright US LLP

(57) ABSTRACT

The invention concerns an item comprising a substrate having at least one main surface coated with a layer A in direct contact with a hydrophobic outer layer B, characterized in that said layer A has been obtained by depositing, under ion beam, activated species from at least one compound C, in gas form, containing, in the structure of same: at least one carbon atom, at least one hydrogen atom, at least one Si—X group, in which X is a hydroxy group or a hydrolysable group chosen from the H, halogen, alkoxy, aryloxy and acyloxy groups, —NR$^1$R$^2$ in which R$^1$ and R$^2$ separately designate a hydrogen atom, an alkyl group or an aryl group, and —N(R$^3$)—Si in which R$^3$ designates an alkyl group or an aryl group, said compound C being neither tetramethyldisiloxane nor tetraethoxysilane, nor vinylmethyldiethoxysilane, nor hexamethylcyclotrisilazane, said layer A not being formed from inorganic precursor compounds.

22 Claims, 1 Drawing Sheet

(56) References Cited

FOREIGN PATENT DOCUMENTS

| JP | 2010-217630 | 9/2010 |
| WO | WO1995/023652 | 9/1995 |
| WO | WO2008/062142 | 5/2008 |
| WO | WO2010/109154 | 9/2010 |
| WO | WO2013/098531 | 7/2013 |
| WO | WO2014/199103 | 12/2017 |

OTHER PUBLICATIONS

Office Action issued in Corresponding Japanese Patent Application No. 2016-518574, dated Mar. 26, 2019. (English Translation).

* cited by examiner

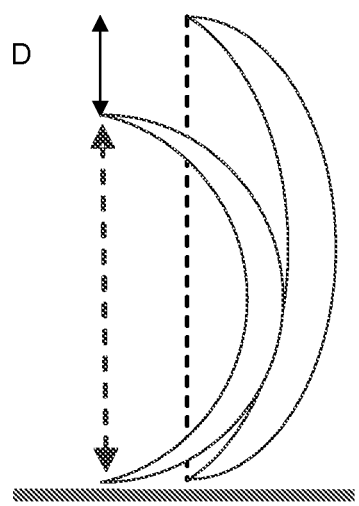

ITEM COATED WITH A SILICON/ORGANIC LAYER IMPROVING THE PERFORMANCES OF AN OUTER COATING

This application is a national phase application under 35 U.S.C. § 371 of International Application No. PCT/FR2014/051463 filed 13 Jun. 2014, which claims priority to French Application No. 1355604 filed 14 Jun. 2013. The entire contents of each of the above-referenced disclosures is specifically incorporated by reference herein without disclaimer.

The present invention generally relates to an article, preferably an optical article, especially an ophthalmic lens, possessing an external coating, preferably an anti-smudge coating, the performance of which is improved by the presence of a subjacent layer, and to a process for producing such an article. The article furthermore has improved thermomechanical properties and a limited tendency to develop cosmetic defects over time.

Optical articles most often comprise an exterior layer that modifies surface energy, for example a hydrophobic and/or oleophobic anti-smudge coating, well known in the art and generally associated with antireflection coatings. It is most often a question of fluorosilane type materials, which decrease surface energy in order to prevent the adhesion of greasy smudges that are thus easier to remove.

Patent application PCT/FR 12053092, in the name of the Applicant, describes an article comprising a substrate having at least one main surface coated with a multilayer interference coating, said coating containing a layer A not formed from inorganic precursor compounds and having a refractive index lower than or equal to 1.55, which is:

either the external layer of the interference coating;
or an intermediate layer, making direct contact with the external layer of the interference coating, this external layer of the interference coating being in this second case an additional layer having a refractive index lower than or equal to 1.55, said layer A being obtained by depositing, under an ion beam, activated species originating from at least one precursor compound C in gaseous form and of silico-organic nature such as octamethylcyclotetrasiloxane.

In the case where the layer A is the external layer of the interference coating, it has been observed that the performance of the anti-smudge coating deposited directly on this layer A is unsatisfactory. Depositing an additional layer, typically a silica layer, between the layer A and the anti-smudge coating allows the performance of the anti-smudge coating to be improved but complicates the deposition process and slightly decreases the scratch resistance and adhesive properties relative to the preceding embodiment.

For this reason, in order to be able to fully benefit from the advantages of the organic layer A, it would be desirable to be able to improve the performance of the external coating, in particular an anti-smudge coating, without having to interpose an additional layer between the layer A and this external coating. Moreover, the use of organic layers A deposited by ion beam may cause, on certain substrates, whitish and translucent cosmetic defects taking the form of spots and lines extending over the entire surface of the lenses and visible under certain lighting conditions (arc lamp or tensioscope) to gradually appear. The appearance of cosmetic defects on the optical article after its production prevents it from being sold. Depending on the substrate, these defects are either present from the start or appear after a certain length of time that may range from a few days to a few months, while the ophthalmic lenses are being worn.

In patent application PCT/FR 12053092, the appearance of these defects may especially be prevented by using a flow of argon during the deposition of the layer A. Nevertheless, this has the drawback of requiring the process to be adjusted and controlled in order to ensure the absence of cosmetic defects. It would therefore be preferable to have a more robust process less sensitive to parameter changes.

U.S. Pat. No. 6,919,134 describes an optical article comprising an antireflection coating containing at least one what is called "hybrid" layer obtained by coevaporation of an organic compound and an inorganic compound, thereby providing the coating with a better adhesion, a better thermal resistance and a better abrasion resistance. The antireflection coating preferably contains two "hybrid" layers, one in an internal position and the other in an external position. These layers are generally deposited by ion-assisted coevaporation, typically of silica and of a modified silicone oil.

Patent application JP 2007-078780 describes a spectacle eyeglass comprising a multilayer antireflection coating, the external layer of which is what is called an "organic" low refractive index layer. This layer is deposited by wet processing (spin coating or dip coating), whereas the inorganic layers of the antireflection coating are deposited by ion-assisted vacuum deposition. The patent application indicates that such an antireflection stack possesses a better thermal resistance than an antireflection coating composed exclusively of inorganic layers. Said "organic" layer preferably contains a mixture of silica particles and an organosilane binder such as γ-glycidoxypropyltrimethoxysilane.

Patent application JP 05-323103 describes the incorporation of an organic fluorocompound in the last layer of an optical multilayer stack containing layers of $SiO_2$ and of $TiO_2$, with a view to making it hydrophobic and thus minimizing changes in its optical characteristics caused by the absorption of water. The fluorine-containing layer is obtained by vapor phase deposition of the constituent material of the layer in an atmosphere composed of a fluorine-containing precursor, which may be tetrafluoroethylene or a fluoroalkyl silane.

The problem of the appearance of cosmetic defects and of the performance of an external coating is not addressed in any of the documents cited above.

Moreover, during the trimming and fitting of an eyeglass at an optician's, the eyeglass undergoes mechanical deformations that may produce cracks in mineral interference coatings, in particular when the operation is not carried out with care. Similarly, thermal stresses (heating of the frame) may produce cracks in the interference coating. Depending on the number and the size of the cracks, the latter may mar the field of view of the wearer and prevent the eyeglass from being sold. Furthermore, while the treated organic eyeglasses are being worn, scratches may appear. In mineral interference coatings, certain scratches lead to cracking, making the scratches more visible because of scattering of light.

Thus, another objective of the invention is to obtain a coating, especially an interference coating, and in particular an antireflection coating, having improved thermomechanical properties, while preserving good adhesive properties, the coating moreover developing no (or almost no) cosmetic defects over time. In particular, the invention relates to articles possessing an improved critical temperature, i.e. having a good resistance to cracking when they are subjected to a temperature increase.

Specifically, the inventors have discovered that modifying the nature of the layer deposited immediately under the external coating of the article, which, in ophthalmic optics, is generally a low refractive index layer of an interference coating (typically a silica layer) making contact with an anti-smudge coating, allows the targeted objectives to be achieved. According to the invention, this layer is formed by depositing, under an ion beam, activated species, in gaseous form, which species are obtained, preferably exclusively, from precursor materials that are organic in nature and contain at least one silicon-hydrolyzable group bond and preferably at least one hydrogen-silicon bond.

The targeted aims are therefore achieved according to the invention by an article comprising a substrate having at least one main surface coated with a layer A, said layer A making direct contact with a hydrophobic external coating B and having been obtained by depositing, under an ion beam, activated species originating from at least one compound C, in gaseous form, containing in its structure:
- at least one carbon atom;
- at least one hydrogen atom;
- at least one Si—X group, where X is a hydroxy group or a hydrolyzable group chosen from the groups H, halogen, alkoxy, aryloxy, acyloxy, —$NR^1R^2$ where $R^1$ and $R^2$ designate independently a hydrogen atom, an alkyl group or an aryl group, and —$N(R^3)$—Si where $R^3$ designates an alkyl group or an aryl group;
- and optionally at least one nitrogen atom and/or at least one oxygen atom,
- said compound C being neither tetramethyldisiloxane, nor tetraethoxysilane, nor vinylmethyldiethoxysilane, nor hexamethylcyclotrisilazane and said layer A not being formed from inorganic precursor compounds.

The invention will be described in greater detail with reference to the appended drawing, in which FIG. 1 schematically shows the deformation experienced by the eyeglass and the way in which this deformation D is measured in the bending resistance test described in the experimental section.

In the present application, when an article has one or more coatings on its surface, the expression "to deposit a layer or a coating on the article" is understood to mean that a layer or a coating is deposited on the uncovered (exposed) surface of the external coating of the article, i.e. its coating furthest from the substrate.

A coating that is "on" a substrate or that has been deposited "on" a substrate is defined as a coating that (i) is positioned above the substrate, (ii) does not necessarily make contact with the substrate (although preferably it does), i.e. one or more intermediate coatings may be arranged between the substrate and the coating in question, and (iii) does not necessarily completely cover the substrate (although preferably it will do). When "a layer 1 is located under a layer 2", it will be understood that the layer 2 is further from the substrate than the layer 1.

The article produced according to the invention comprises a substrate, preferably a transparent substrate, having front and back main faces, at least one of said main faces and preferably both main faces comprising a layer A.

The "back face" of the substrate (the back face is generally concave) is understood to be the face that, when the article is being used, is closest to the eye of the wearer. Conversely, the "front face" of the substrate (the front face is generally convex) is understood to be the face that, when the article is being used, is furthest from the eye of the wearer.

Although the article according to the invention may be any type of article, such as a screen, a glazing unit, a pair of protective glasses that may especially be used in a working environment, a mirror, or an article used in electronics, it is preferably an optical article, more preferably an optical lens, and even more preferably an ophthalmic lens for a pair of spectacles, or a blank optical or ophthalmic lens such as a semi-finished optical lens, and in particular a spectacle glass. The lens may be a polarized or tinted lens or a photochromic lens. Preferably, the ophthalmic lens according to the invention has a high transmission.

The layer A according to the invention may be formed on at least one of the main faces of a bare substrate, i.e. an uncoated substrate, or on at least one of the main faces of a substrate already coated with one or more functional coatings.

The substrate of the article according to the invention is preferably an organic eyeglass, for example made of thermoplastic or thermosetting plastic. This substrate may be chosen from the substrates mentioned in patent application WO 2008/062142, and may for example be a substrate obtained by (co)polymerization of diethyleneglycol bis-allylcarbonate, a poly(thio)urethane substrate or a substrate made of (thermoplastic) bis-phenol-A polycarbonate (PC).

Before the layer A is deposited on the substrate, which is optionally coated, for example with an anti-abrasion and/or anti-scratch coating, it is common to subject the surface of said optionally coated substrate to a physical or chemical activation treatment intended to increase the adhesion of the layer A. This pre-treatment is generally carried out under vacuum. It may be a question of a bombardment with energetic and/or reactive species, for example an ion beam (ion pre-cleaning or IPC) or an electron beam, a corona discharge treatment, a glow discharge treatment, a UV treatment or treatment in a vacuum plasma, generally an oxygen or argon plasma. It may also be a question of an acidic or basic surface treatment and/or a treatment with solvents (water or organic solvent(s)). Several of these treatments may be combined. By virtue of these cleaning treatments, the cleanliness and the reactivity of the surface of the substrate are optimized.

The term "energetic species" (and/or "reactive species") is particularly understood to mean ionic species having an energy ranging from 1 to 300 eV, preferably from 1 to 150 eV, better still from 10 to 150 eV and even better still from 40 to 150 eV. The energetic species may be chemical species, such as ions, radicals, or species such as photons or electrons.

The preferred pre-treatment of the surface of the substrate is an ion bombardment treatment carried out by means of an ion gun, the ions being particles formed from gas atoms from which one or more electrons have been stripped. Argon is preferably used as the gas ionized ($Ar^+$ ions), though oxygen or a mixture of oxygen and argon may also be used, under an acceleration voltage generally ranging from 50 to 200 V, a current density generally contained between 10 and 100 µA/cm² at the activated surface, and generally under a residual pressure in the vacuum chamber possibly ranging from $8 \times 10^{-5}$ mbar to $2 \times 10^{-4}$ mbar.

The article according to the invention comprises a layer A that preferably consists of a monolayer interference coating or the external layer of a multilayer coating, preferably a multilayer interference coating, i.e. the layer of the (interference) coating furthest from the substrate in the stacking order. Said interference coating is preferably formed on an anti-abrasion coating. Anti-abrasion coatings based on epoxysilane hydrolysates containing at least two and preferably at least three hydrolyzable groups, bonded to the silicon atom, are preferred. The hydrolyzable groups are preferably alkoxysilane groups.

The interference coating may be any interference coating conventionally used in the field of optics, in particular ophthalmic optics, provided that it contains an external layer A formed by depositing, under an ion beam, activated species issued from an organic derivative, preferably a hydride of silicon, in gaseous form. The interference coating may be, nonlimitingly, an antireflection coating, a reflective (mirror) coating, an infrared filter or an ultraviolet filter, but is preferably an antireflection coating.

An antireflection coating is a coating, deposited on the surface of an article, which improves the antireflection properties of the final article. It reduces the reflection of light at the article/air interface over a relatively broad portion of the visible spectrum.

As is well known, these interference (preferably antireflection) coatings conventionally contain a monolayer or multilayer stack of dielectric materials. These are preferably multilayer coatings, comprising layers with a high refractive index (HI) and layers with a low refractive index (LI).

In the present patent application, a layer of the interference coating is said to be a high refractive index layer when its refractive index is higher than 1.55, preferably higher than or equal to 1.6, more preferably higher than or equal to 1.8 and even more preferably higher than or equal to 2.0. A layer of an interference coating is said to be a low refractive index layer when its refractive index is lower than or equal to 1.55, preferably lower than or equal to 1.50 and more preferably lower than or equal to 1.45. Unless otherwise indicated, the refractive indices to which reference is made in the present invention are expressed at 25° C. for a wavelength of 630 nm.

The HI layers are conventional high refractive index layers, well known in the art. They generally contain one or more mineral oxides such as, nonlimitingly, zirconia ($ZrO_2$), titanium oxide ($TiO_2$), tantalum pentoxide ($Ta_2O_5$), neodymium oxide ($Nd_2O_5$), hafnium oxide ($HfO_2$), praseodymium oxide ($Pr_2O_3$), praseodymium titanate ($PrTiO_3$), $La_2O_3$, $Nb_2O_5$, $Y_2O_3$, indium oxide $In_2O_3$, or tin oxide $SnO_2$. Preferred materials are $TiO_2$, $Ta_2O_5$, $PrTiO_3$, $ZrO_2$, $SnO_2$, $In_2O_3$ and their mixtures.

The LI layers are also well known layers and may contain, nonlimitingly, $SiO_2$, $MgF_2$, $ZrF_4$, alumina ($Al_2O_3$) in a small proportion, $AlF_3$ and their mixtures, but are preferably $SiO_2$ layers. Layers made of SiOF (fluorine-doped $SiO_2$) may also be used. Ideally, the interference coating of the invention comprises no layer containing a mixture of silica and alumina.

Generally, the HI layers have a physical thickness ranging from 10 nm to 120 nm and the LI layers have a physical thickness ranging from 10 nm to 100 nm.

The total thickness of the interference coating is preferably smaller than 1 micron, more preferably smaller than or equal to 800 nm and even more preferably smaller than or equal to 500 nm. The total thickness of the interference coating is generally larger than 100 nm, and preferably larger than 150 nm.

Even more preferably, the interference coating, which is preferably an antireflection coating, contains at least two low refractive index (LI) layers and at least two high refractive index (HI) layers. The total number of layers in the interference coating is preferably smaller than or equal to 8 and more preferably smaller than or equal to 6.

The HI and LI layers need not be alternated in the interference coating though they may be in one embodiment of the invention. Two (or more) HI layers may be deposited on each other just as two (or more) LI layers may be deposited on each other.

Preferably, all the low refractive index layers of the interference coating according to the invention except for the layer A are inorganic in nature (i.e. the other low refractive index layers of the interference coating preferably do not contain any organic compounds).

Preferably, all the layers of the interference coating according to the invention except for the layer A are inorganic in nature, or in other words the layer A is preferably the only layer of organic nature in the interference coating of the invention (the other layers of the interference coating preferably containing no organic compounds).

According to one embodiment of the invention, the interference coating comprises an underlayer. In this case, the underlayer generally forms the first layer of this interference coating in the order of deposition of the layers, i.e. the underlayer is the layer of the interference coating that makes contact with the underlying coating (which is generally an anti-abrasion and/or anti-scratch coating), or with the substrate when the interference coating is deposited directly on the substrate.

The expression "underlayer of the interference coating" is understood to mean a coating of relatively large thickness used with the aim of improving the resistance of said coating to abrasion and/or scratches and/or to promote adhesion of the coating to the substrate or to the underlying coating. The underlayer according to the invention may be chosen from the underlayers described in patent application WO 2010/109154. Preferably, the underlayer is between 100 to 200 nm in thickness. It is preferably exclusively mineral in nature and is preferably made of silica $SiO_2$.

The article of the invention may be made antistatic by incorporating at least one electrically conductive layer into the interference coating. The term "antistatic" is understood to mean the property of not storing and/or building up an appreciable electrostatic charge. An article is generally considered to have acceptable antistatic properties when it does not attract and hold dust and small particles after one of its surfaces has been rubbed with an appropriate cloth.

The electrically conductive layer may be located in various places in the interference coating, provided that this does not interfere with the antireflection properties of the latter. It may for example be deposited on the underlayer of the interference coating, if an underlayer is present. It is preferably located between two dielectric layers of the interference coating, and/or under a low refractive index layer of the interference coating.

The electrically conductive layer must be sufficiently thin not to decrease the transparency of the interference coating. Generally, its thickness ranges from 0.1 to 150 nm and preferably from 0.1 to 50 nm depending on its nature. A thickness smaller than 0.1 nm generally does not allow sufficient electrical conductivity to be obtained, whereas a thickness larger than 150 nm generally does not allow the required transparency and low-absorption properties to be obtained.

The electrically conductive layer is preferably made from an electrically conductive and highly transparent material. In this case, its thickness preferably ranges from 0.1 to 30 nm, more preferably from 1 to 20 nm and even more preferably from 2 to 15 nm. The electrically conductive layer preferably contains a metal oxide chosen from indium oxide, tin oxide, zinc oxide and their mixtures. Indium tin oxide (tin-doped indium oxide, $In_2O_3$:Sn), indium oxide ($In_2O_3$), and tin oxide $SnO_2$ are preferred. According to one optimal embodiment, the electrically conductive and optically transparent layer is a layer of indium tin oxide (ITO).

Generally, the electrically conductive layer contributes to the antireflection properties obtained and forms a high refractive index layer in the interference coating. This is the case for layers made from an electrically conductive and highly transparent material such as layers of ITO.

The electrically conductive layer may also be a very thin layer of a noble metal (Ag, Au, Pt, etc.) typically smaller than 1 nm in thickness and preferably less than 0.5 nm in thickness.

The various layers of the interference coating (including the optional antistatic layer) other than the layer A are preferably deposited by vacuum deposition using one of the following techniques: i) evaporation, optionally ion-assisted evaporation, ii) ion-beam sputtering, iii) cathode sputtering or iv) plasma-enhanced chemical vapor deposition. These various techniques are described in the books "Thin Film Processes" and "Thin Film Processes II", edited by Vossen and Kern, Academic Press, 1978 and 1991, respectively. The vacuum evaporation technique is particularly recommended.

Preferably, each of the layers of the interference coating is deposited by vacuum evaporation.

The layer A is preferably a low refractive index layer as defined according to the invention having a refractive index 1.55. In some embodiments of the invention the refractive index of the layer A is preferably higher than or equal to 1.45, more preferably higher than or equal to 1.47, even more preferably higher than or equal to 1.48 and ideally higher than or equal to 1.49.

The layer A is obtained by depositing, under an ion beam, activated species originating from at least one compound C, in gaseous form, containing in its structure at least one Si—X group, where X is a hydroxy group or a hydrolyzable group chosen from the groups H, halogen, alkoxy, aryloxy, acyloxy, —NR$^1$R$^2$ where R$^1$ and R$^2$ designate independently a hydrogen atom, an alkyl group or an aryl group, and —N(R$^3$)—Si where R$^3$ designates an alkyl group or an aryl group; at least one carbon atom; at least one hydrogen atom; and, optionally, at least one nitrogen atom and/or at least one oxygen atom, said compound C being neither tetramethyldisiloxane, nor tetraethoxysilane, nor vinylmethyldiethoxysilane, nor hexamethylcyclotrisilazane.

Preferably, the compound C is neither 1,2,3,4,5,6-hexamethylcyclotrisilazane, nor 2,2,4,4,6,6-hexamethylcyclotrisilazane. The definition of the groups —NR$^1$R$^2$ and —N(R$^3$)—Si indicated above naturally excludes compounds such as hexamethyldisilazane.

Preferably, the deposition is carried out in a vacuum chamber comprising an ion gun directed toward the substrates to be coated, which emits, toward said substrates, a beam of positive ions generated in a plasma within the ion gun. Preferably, the ions issued from the ion gun are particles formed from gas atoms from which one or more electrons have been stripped, the gas being a noble gas, oxygen or a mixture of two or more of these gases.

A precursor, the compound C, is introduced in a gaseous state into the vacuum chamber, preferably in the direction of the ion beam, and is activated under the effect of the ion gun.

Without wanting to be limited to any one theory, the inventors think that the plasma of the ion gun projects into a zone located a certain distance in front of the gun, without however reaching the substrates to be coated, and that activation/disassociation of the precursor compound C takes place preferentially in this zone, more generally near the ion gun, and to a lesser extent in the ion gun.

This deposition technique using an ion gun and a gaseous precursor, sometimes referred to as "ion beam deposition", is especially described in patent U.S. Pat. No. 5,508,368.

According to the invention, the ion gun is preferably the only place in the chamber where a plasma is generated.

The ions may, if required, be neutralized before they exit the ion gun. In this case, the bombardment is still considered to be ion bombardment. The ion bombardment causes atomic rearrangement in and a densification of the layer being deposited, tamping it down while it is being formed.

During the implementation of the process according to the invention, the surface to be treated is preferably bombarded by ions with a current density generally comprised between 20 and 1000 µA/cm$^2$, preferably between 30 and 500 µA/cm$^2$, more preferably between 30 and 200 µA/cm$^2$ at the activated surface and generally under a residual pressure in the vacuum chamber possibly ranging from $6 \times 10^{-5}$ mbar to $2 \times 10^{-4}$ mbar and preferably from $8 \times 10^{-5}$ mbar to $2 \times 10^{-4}$ mbar. An argon and/or oxygen ion beam is preferably used. When a mixture of argon and oxygen is used the Ar:O$_2$ molar ratio is preferably ≤1, more preferably ≤0.75 and even more preferably ≤0.5. This ratio may be controlled by adjusting the gas flow rates in the ion gun. The argon flow rate preferably ranges from 0 to 30 sccm. The oxygen O$_2$ flow rate preferably ranges from 5 to 30 sccm, and rises in proportion to the flow rate of the precursor compound of the layer A.

The ions of the ion beam, which are preferably issued from an ion gun used during the deposition of the layer A, preferably have an energy ranging from 75 to 150 eV, more preferably from 80 to 140 eV and even more preferably from 90 to 110 eV. The activated species formed are typically radicals or ions.

The technique of the invention differs from a deposition by means of a plasma (PECVD for example) in that it involves a bombardment, by means of an ion beam, of the layer A being formed, which beam is preferably emitted by an ion gun.

In addition to the ion bombardment during the deposition, it is possible to carry out a plasma treatment, optionally concomitant with the deposition under ion beam, of the layer A. The layer is preferably deposited without the plasma assistance at the substrate level.

Said layer A is deposited in the presence of an oxygen source when the precursor compound C does not contain (or does not contain enough) oxygen atoms and it is desired for the layer A to contain a certain proportion of oxygen. Likewise, said layer A is deposited in the presence of a nitrogen source when the precursor compound C does not contain (or does not contain enough) nitrogen atoms and it is desired for the layer A to contain a certain proportion of nitrogen.

Apart from the layer A, other layers of the interference coating may be deposited under an ion beam. The evaporation of the precursor materials of the layer A, carried out under vacuum, may be achieved using a joule heat source.

The precursor material of the layer A comprises at least one compound C, which is organic in nature, containing in its structure at least one Si—X group, where X is a hydroxy group or a hydrolyzable group chosen from the groups H, halogen, alkoxy, aryloxy, acyloxy, —NR$^1$R$^2$ where R$^1$ and R$^2$ designate independently a hydrogen atom, an alkyl group or an aryl group, and —N(R$^3$)—Si where R$^3$ designates an alkyl group or an aryl group; at least one carbon atom; at least one hydrogen atom; and, optionally, at least one nitrogen atom and/or at least one oxygen atom, said compound C being neither tetramethyldisiloxane, nor tetraethoxysilane, nor vinylmethyldiethoxysilane, nor hexamethylcyclotrisilazane.

The compound C preferably contains in its structure at least one Si—H group, i.e. is a silicon hydride. Preferably, the silicon atom of the group Si—X is not bonded to more than two non-hydrolyzable groups such as alkyl or aryl groups.

Among the groups X: the acyloxy groups have the formula —O—C(O)R$^4$ where R$^4$ is a preferably C6-C12 aryl group optionally substituted with one or more functional groups, or a linear or branched and preferably C1-C6 alkyl group optionally substituted with one or more functional groups and possibly furthermore comprising one or more double bonds, such as the phenyl, methyl or ethyl groups; the aryloxy and alkoxy groups have the formula —O—R$^5$ where R$^5$ is a preferably C6-C12 aryl group optionally substituted with one or more functional groups, or a linear or branched and preferably C1-C6 alkyl group optionally substituted with one or more functional groups and possibly furthermore comprising one or more double bonds, such as the phenyl, methyl or ethyl groups; the halogens are preferably F, Cl, Br or I; the groups X of formula —NR$^1$R$^2$ may designate an amino group NH$_2$ or an alkylamino, arylamino, dialkylamino or diarylamino group; R$^1$ and R$^2$ independently designate a hydrogen atom, a preferably C6-C12 aryl group optionally substituted with one or more functional groups, or a linear or branched and preferably C1-C6 alkyl group optionally substituted with one or more functional groups and possibly furthermore comprising one or more double bonds, such as the phenyl, methyl or ethyl groups; and the groups X of formula —N(R$^3$)—Si are attached to the silicon atom by way of their nitrogen atom and their silicon atom naturally comprises three other substituents, where R$^3$ designates a preferably C6-C12 aryl group optionally substituted with one or more functional groups, or a linear or branched and preferably C1-C6 alkyl group optionally substituted with one or more functional groups and possibly furthermore comprising one or more double bonds, such as the phenyl, methyl or ethyl groups.

The preferred acyloxy group is the acetoxy group. The preferred aryloxy group is the phenoxy group. The preferred halogen is Cl. The preferred alkoxy groups are the methoxy and ethoxy groups.

Preferably, the compound C contains at least one nitrogen atom and/or at least one oxygen atom and preferably at least one oxygen atom.

The concentration of each chemical element (Si, 0, C, H, N) in the layer A may be determined using the Rutherford backscattering spectrometry technique (RBS) and elastic recoil detection analysis (ERDA).

The atomic percentage of carbon atoms in the layer A preferably ranges from 8 to 25% and more preferably from 15 to 25%. The atomic percentage of hydrogen atoms in the layer A preferably ranges from 8 to 40% and more preferably from 10 to 20%. The atomic percentage of silicon atoms in the layer A preferably ranges from 5 to 30% and more preferably from 15 to 25%. The atomic percentage of oxygen atoms in the layer A preferably ranges from 20 to 60% and more preferably from 35 to 45%.

The precursor compound of the layer A preferably contains at least one silicon atom bearing at least one preferably C1-C4 alkyl group, better still at least one silicon atom bearing one or two identical or different preferably C1-C4 alkyl groups, and a group X (preferably a hydrogen atom) directly bonded to the silicon atom, X having the meaning indicated above. The preferred alkyl group is the methyl group. The vinyl group may also be used instead of an alkyl group. Preferably, the compound C comprises at least one Si—C bond and better still the silicon atom of the group Si—X is directly bonded to at least one carbon atom.

Preferably, each silicon atom of the compound C is not directly bonded to more than two groups X, better still is not directly bonded to more than one group X (preferably a hydrogen atom), and better still, each silicon atom of the compound C is directly bonded to a single group X (preferably a hydrogen atom). Preferably, the compound C has an Si/O atomic ratio equal to 1. Preferably, the compound C has a C/Si atomic ratio <2, preferably ≤1.8, better still ≤1.6 and even better still ≤1.5 or 1.3 and optimally equal to 1. Again preferably, the compound C has a C/O atomic ratio equal to 1. According to one embodiment, the compound C does not comprise an Si—N group and better still does not comprise any nitrogen atoms.

The silicon atom or atoms of the precursor compound of the layer A are preferably only bonded to alkyl groups, hydrogen and/or groups containing an —O—Si or —NH—Si chain so as to form an Si—O—Si or Si—NH—Si group. In one embodiment, the compound C contains at least one Si—O—Si—X group or at least one Si—NH—Si—X group, X having the meaning indicated above and preferably representing a hydrogen atom.

The precursor compounds of the layer A preferably contain an Si—O—Si group and more preferably a group of formula:

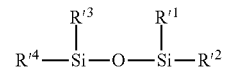

where R$'^1$ to R$'^4$ independently designate preferably C1-C4 vinyl or alkyl groups (for example the methyl group), aryl groups or a group X (preferably a hydrogen atom), one at least of R$'^1$ to R$'^4$ designating a group X (preferably a hydrogen atom), X having the meaning indicated above.

According to one preferred embodiment, the compound C is a cyclic polysiloxane of formula:

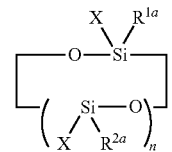

where X has the meaning indicated above and preferably represents a hydrogen atom, n designates an integer ranging from 2 to 20 and preferably from 3 to 8, and R$^{1a}$ and R$^{2a}$ independently represent a preferably C1-C4 alky group (for example the methyl group) or a vinyl or aryl group or a hydrolyzable group. Nonlimiting examples of hydrolyzable groups for R$^{1a}$ and R$^{2a}$ are the chloro, bromo, alkoxy, acyloxy, aryloxy and H groups. The most common members belonging to this group are the tetra-, penta- and hexa-alkylcyclotetrasiloxanes, preferably the tetra-, penta-et hexa-methylcyclotetrasiloxanes, 2,4,6,8-tetramethylcyclotetrasiloxane (TMCTS) being the preferred compound. In certain cases, the layer A is obtained from a mixture of a certain number of compounds the n of which may vary within the limits indicated above.

According to another embodiment, the compound C is a linear alkylhydrosiloxane, better still a linear methylhydrosiloxane such as for example 1,1,1,3,5,7,7,7-octamethyl tetrasiloxane, 1,1,1,3,5,5,5-heptamethyltrisiloxane or 1,1,3,3,5,5-hexamethyl trisiloxane.

The following compounds are nonlimiting examples of cyclic or non-cyclic organic precursor compounds of the layer A: 2,4,6,8-tetramethylcyclotetrasiloxane (TMCTS of formula (1)), 2,4,6,8-tetraethylcyclotetrasiloxane, 2,4,6,8-tetraphenylcyclotetrasiloxane, 2,4,6,8-tetraoctylcyclotetrasiloxane, 2,2,4,6,6,8-hexamethylcyclotetrasiloxane, 2,4,6-trimethylcyclotrisiloxane, cyclotetrasiloxane, 1,3,5,7,9-pentamethyl cyclopentasiloxane, 2,4,6,8,10-hexamethylcyclohexasiloxane, 1,1,1,3,5,7,7,7-octamethyl tetrasiloxane, 1,1,3,3,5,5-hexamethyltrisiloxane, 1,1,1,3,5,5,5-heptamethyl trisiloxane, tris(trimethylsiloxy)silane (of formula (2)), 1,1,3,3-tetramethyldisilazane, 1,2,3,4,5,6,7,8-octamethylcyclotetrasilazane, nonamethyl trisilazane, and tris(dimethylsilyl)amine.

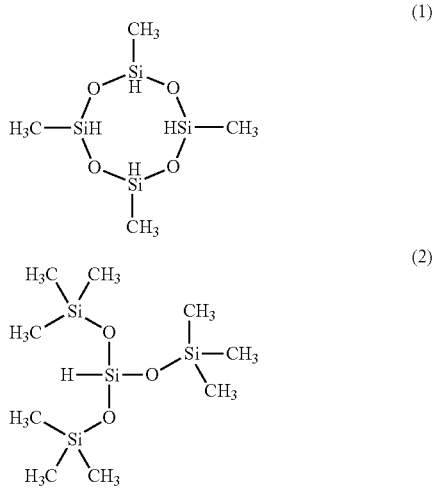

The precursor compound of the layer A is preferably introduced into the vacuum chamber in which articles according to the invention are produced in gaseous form, while controlling its flow rate. In other words, it is preferably not vaporized inside the vacuum chamber. The feed of the precursor compound of the layer A is located a distance away from the exit of the ion gun preferably ranging from 30 to 50 cm.

Preferably, the layer A contains no fluorocompounds. According to the invention, it is not formed from inorganic (mineral) precursor compounds and, in particular, it is not formed from precursors having a metal oxide nature. Therefore, it is particularly different in this case from the "hybrid" layers described in patent U.S. Pat. No. 6,919,134. Preferably, the layer A does not contain a separate metal oxide phase, and more preferably does not contain any inorganic compounds. In the present application, metalloid oxides are considered to be metal oxides.

The process allowing the interference coating according to the invention to be formed is therefore much simpler and less expensive than processes in which an organic compound and an inorganic compound are coevaporated, such as the process described in patent U.S. Pat. No. 6,919,134 for example. In practice, co-evaporation processes are very difficult to implement and difficult to control due to reproducibility problems. Specifically, the respective amounts of organic and inorganic compounds present in the deposited layer vary a lot from one operation to another.

Since the layer A is formed by vacuum deposition, it does not contain any silane hydrolysate and therefore differs from sol-gel coatings obtained by liquid processing.

The layer A preferably has a thickness ranging from 20 to 150 nm and more preferably from 25 to 120 nm. When it forms the external layer of an interference coating, the layer A preferably has a thickness ranging from 60 to 100 nm.

When designing a stack according to the invention, for example an interference coating, mechanical stresses are other properties to be taken into account. The stress in the layer A is zero or negative. In the latter case the layer is under compression. This compressive stress preferably ranges from 0 to −500 MPa, better still from −20 to −500 MPa and even better still from −50 to −500 MPa. The optimal compressive stress ranges from −150 to −400 MPa and preferably from −200 to −400 MPa. It is measured at a temperature of 20° C. and under a relative humidity of 50% in the way described below. It is the deposition conditions of the invention that allow this stress to be achieved.

The principle of the stress measurement is based on the detection of deformation of a thin substrate. As the geometry and the mechanical properties of the substrate, its deformation and the thickness of the deposited layer are known, stress may be calculated using Stoney's formula. The stress $\sigma_{tot}$ is obtained by measuring the curvature of practically flat polished substrates made of (100) silicon or mineral glass before and after deposition of a monolayer according to the invention, or of a complete interference stack, on a face of the substrate having a very slight concavity, then by calculating the stress value using Stoney's formula:

$$\sigma = \frac{1}{6R} \frac{E_S d_S^2}{(1 - v_S) d_f} \quad (1)$$

in which $$\frac{E_S}{(1 - v_S)}$$

is the biaxial elastic modulus of the substrate, $d_s$ is the thickness of the substrate (m), $d_f$ is the thickness of the film (m), $E_s$ is the Young's modulus of the substrate (Pa), $v_s$ is the Poisson's ratio of the substrate, $$R = \frac{R_1 R_2}{R_1 - R_2} \quad (2)$$

and in which $R_1$ is the measured radius of curvature of the substrate before the deposition and $R_2$ is the measured radius of curvature of the substrate coated with the film after the deposition. The curvature is measured by means of a Tencor FLX 2900 (Flexus) apparatus. A Class IIIa laser with a power of 4 milliwatts (mW) at 670 nm is used for the measurement. The apparatus allows internal stresses to be measured as a function of time or temperature (maximum temperature of 900° C.).

The following parameters are used to calculate the stress: Biaxial elastic modulus of Si: 180 GPa; Thickness of the Si substrate: 300 microns; Scan length: 40 mm; Thickness of the deposited film (measured by ellipsometry): 200-500 nm. The measurements are carried out at room temperature under air.

To determine the stress in an interference coating, the coating is deposited on a given suitable substrate and then the stress is measured as above. The stress in the interference coating according to the invention generally ranges from 0 to −400 MPa, preferably from −50 to −300 MPa, more preferably from −80 to −250 MPa, and even more preferably from −100 to −200 MPa.

The layers A of the invention have elongations at break higher than those of inorganic layers and may therefore undergo deformations without cracking. Thus, the article according to the invention has a greater resistance to bending, as is demonstrated in the experimental section.

The critical temperature of a coated article according to the invention is preferably higher than or equal to 80° C., better still higher than or equal to 90° C. and even better still higher than or equal to 100° C. In the present application, the critical temperature of an article or a coating is defined as being the temperature from which cracks are observed to appear in the stack present on the surface of the substrate, this resulting in degradation of the coating. This high critical temperature is due to the presence of the layer A on the surface of the article, as demonstrated in the experimental section. Without wanting to be limited to one interpretation of the invention, the inventors think that, apart from the nature of the layer, using layers A, since they allow compressive stress in the stack on the whole to be increased, improves the critical temperature of the article.

Because of its improved thermomechanical properties, the layer A, which optionally forms part of an interference coating, may especially be applied to a single face of a semi-finished lens, generally its front face, the other face of this lens still needing to be machined and treated. The stack present on the front face of the lens will not be degraded by temperature rises due to treatments to which the back face is subjected when coatings deposited on this back face are hardened or by any other action liable to increase the temperature of the lens.

According to one preferred embodiment, the interference coating of the invention is an antireflection coating comprising, in the deposition order, on the surface of the optionally coated substrate, a $ZrO_2$ layer that is generally from 10 to 40 nm in thickness and preferably from 15 to 35 nm in thickness, an $SiO_2$ layer that is generally from 10 to 40 nm in thickness and preferably from 15 to 35 nm in thickness, a $ZrO_2$ or $TiO_2$ layer that is generally from 40 to 150 nm in thickness and preferably from 50 to 120 nm in thickness, and an ITO layer that is generally from 1 to 15 nm in thickness and preferably from 2 to 10 nm in thickness, and a layer A according to the invention, which is generally from 50 to 150 nm in thickness and preferably from 60 to 100 nm in thickness.

Preferably, the average reflection factor in the visible domain (400-700 nm) of an article coated with an interference coating according to the invention, denoted $R_m$, is lower than 2.5% per face, preferably lower than 2% per face and even more preferably lower than 1% per face of the article. In one optimal embodiment, the article comprises a substrate the two main surfaces of which are coated with an interference coating according to the invention, and has a total $R_m$ value (cumulative reflection due to the two faces) lower than 1%. Means for achieving such $R_m$ values are known to those skilled in the art.

The light reflection factor $R_v$ of an interference coating according to the invention is lower than 2.5% per face, preferably lower than 2% per face, more preferably lower than 1% per face of the article, even more preferably ≤0.75%, and more preferably still ≤0.5%.

In the present application, the "average reflection factor" $R_m$ (average of the spectral reflection over the entire visible spectrum between 400 and 700 nm) and the "light reflection factor" $R_v$ are such as defined in standard ISO 13666:1998 and measured according to standard ISO 8980-4.

In some applications, it is preferable for the main surface of the substrate to be coated with one or more functional coatings prior to the deposition of the layer A or the multilayer coating comprising the layer A by way of external layer. These functional coatings, which are conventionally used in optics, may, without limitation, be a primer layer for improving the shock-resistance and/or adhesion of subsequent layers in the final product, an anti-abrasion and/or anti-scratch coating, a polarized coating, a photochromic coating or a tinted coating, and may in particular be a primer layer coated with an anti-abrasion and/or anti-scratch layer. The latter two coatings are described in greater detail in the patent applications WO 2008/015364 and WO 2010/109154.

The article according to the invention comprises a hydrophobic external coating B deposited directly on the layer A and capable of modifying its surface properties, such as a hydrophobic and/or oleophobic coating (also called a topcoat or anti-smudge coating in the present application). Its thickness is in general smaller than or equal to 10 nm, preferably from 1 to 10 nm and better still from 1 to 5 nm. It is described in patent application WO 2009/047426. The hydrophobic external coating B may be a monolayer or multilayer coating and is preferably a monolayer coating. In the case where the coating B comprises a plurality of layers, the layer A makes direct contact with the internal layer of the coating B, i.e. the layer of the coating B closest the substrate in the stacking order.

The hydrophobic and/or oleophobic coatings are defined as coatings the static contact angle with deionized water of which is greater than or equal to 75°, preferably greater than or equal to 90°, and better still greater than or equal to 100°. The static contact angle may be determined using the liquid droplet method, in which a liquid droplet having a diameter smaller than 2 mm is deposited gently on a solid nonabsorbent surface and the angle at the interface between the liquid and the solid surface is measured.

The hydrophobic and/or oleophobic coating is preferably an organic coating, preferably comprising at least one fluorocompound, better still at least one compound of silane and/or silazane nature bearing one or more fluorinated groups (the compound named fluorosilane or fluorosilazane), and in particular fluorinated or even perfluorinated hydrocarbon groups.

It may be obtained by deposition of a fluorosilane or fluorosilazane precursor preferably containing at least two hydrolyzable groups per molecule. The fluorosilane precursors preferably contain fluoro polyether groups and more preferably per-fluoro polyether groups. These fluorosilanes are well known and are described, inter alia, in U.S. Pat. Nos. 5,081,192, 5,763,061, 6,183,872, 5,739,639, 5,922,787, 6,337,235, 6,277,485 and EP 0933377. Such compounds are capable of undergoing, when they are deposited on a surface, polymerization and/or cross-linking reactions directly or after hydrolysis.

The external hydrophobic and/or oleophobic coating preferably has a surface energy of 14 $mJ/m^2$ or less, more preferably of 13 $mJ/m^2$ or less and even more preferably of 12 $mL/m^2$ or less. The surface energy is calculated using the Owens-Wendt method described in the article: "Estimation of the surface force energy of polymers" Owens D. K., Wendt R. G. (1969), J. Appl. Polym. Sci., 13, 1741-1747.

Compounds that may be used to obtain such anti-smudge coatings are described in patents JP 2005-187936 and U.S. Pat. No. 6,183,872.

Commercially available compositions allowing hydrophobic and/or oleophobic coatings to be prepared include KY130® (respecting the formula in patent JP 2005-187936) and KP 801M® sold by Shin-Etsu Chemical, and the composition OPTOOL DSX® (a fluorinated resin comprising perfluoropropylene groups respecting the formula in U.S. Pat. No. 6,183,872) sold by Daikin Industries. The composition OPTOOL DSX® is the preferred anti-smudge coating composition.

Typically, an article according to the invention comprises a substrate coated in succession with an adhesion and/or anti-shock primer layer, an anti-abrasion and/or anti-scratch coating, an optionally antistatic interference coating according to the invention and containing the layer A by way of external layer, and a hydrophobic and/or oleophobic coating.

The inventors have observed that specific use of the precursor compounds C according to the invention rather than precursor compounds such as OMCTS, hexamethyldisiloxane, decamethyltetrasiloxane or decamethylcyclopentasiloxane makes it possible to obtain a hydrophobic external coating B having a satisfactory performance, even though the organic layer A makes direct contact with said hydrophobic external coating B.

Without wanting to be tied to one theory, the inventors think that the presence of Si—X bonds (X having the meaning indicated above) in the precursor compound C is critical to obtaining this result, these Si—X bonds being less stable than Si—C bonds and especially more subject to oxidation and hydrolysis in the presence of oxygen and water present in ambient air. It is assumed that at least some of the molecular structure of the precursor C is integrally preserved during the process for depositing the layer A, because of the particular process implemented to deposit this precursor. Thus, constituent structures of the precursor molecule will be found in the layer A, in particular on the surface of the deposited layer.

According to this hypothesis, the layers A obtained from precursors C according to the invention will comprise on their surface a certain proportion of dangling reactive Si—X bonds. The Si—X bonds once exposed to ambient air and moisture will be able to form reactive Si—OH sites favorable to tying molecules to the upper layer (generally an anti-smudge coating). In contrast, organic layers formed under the same conditions from precursors such as OMCTS, hexamethyldisiloxane, decamethyltetrasiloxane or decamethylcyclopentasiloxane possess only dangling Si-alkyl bonds. Since these groups are hydrophobic and stable, their presence a priori does not promote the condensation and hydrolysis reactions required to graft the precursor molecules of the subsequent coating.

Another advantage of precursor compounds C according to the invention relative to precursor such as OMCTS, hexamethyldisiloxane, decamethyltetrasiloxane or decamethylcyclopentasiloxane is that stacks devoid of cosmetic defects are obtained for a wide range of deposition conditions, this advantageous effect being obtained even with stacks which are more inclined to develop cosmetic defects.

Furthermore, in the case of an interference stack, the fact that the layer A is the external layer of this stack is particularly advantageous because this makes it possible to increase scratch and abrasion resistance and therefore to especially decrease the number of scratches liable to lead to the appearance of cracks in the interference coating.

The invention also relates to a process for manufacturing an article such as defined above, comprising at least the following steps:
  providing an article comprising a substrate having at least one main surface;
  depositing on said main surface of the substrate a layer A;
  depositing directly on said layer A a hydrophobic external coating B;
  obtaining an article comprising a substrate having a main surface coated with said layer A making direct contact with the hydrophobic external coating B, said layer A having been obtained by depositing, under an ion beam, activated species originating from at least one compound C, in gaseous form, containing in its structure: at least one Si—X group, where X is a hydroxy group or a hydrolyzable group chosen from the groups H, halogen, alkoxy, aryloxy, acyloxy, —NR$^1$R$^2$ where R$^1$ and R$^2$ designate independently a hydrogen atom, an alkyl group or an aryl group, and —N(R$^3$)—Si where R$^3$ designates an alkyl group or an aryl group; at least one carbon atom; at least one hydrogen atom; and, optionally, at least one nitrogen atom and/or at least one oxygen atom, said layer A not being formed from inorganic precursor compounds.

BRIEF DESCRIPTION OF THE DRAWINGS

FIG. 1. Depiction of deformation D that the eyeglass can experience before cracks appear.

The invention is illustrated in a nonlimiting way by the following examples. Unless otherwise indicated, refractive indices are given for a wavelength of 630 nm and T=20-25° C.

EXAMPLES

1. General Procedures

The articles employed in the examples comprised a 65 mm-diameter ORMA® ESSILOR lens substrate with a power of −2.00 diopters and a thickness of 1.2 mm (except for the tests for evaluating the possible presence of cosmetic defects, which were carried out on MR8 thiourethane substrates from Mitsui Toatsu Chemicals Inc., of refractive index of 1.59, all else moreover being equal), coated on its concave face with the anti-shock primer coating and the anti-scratch and anti-abrasion coating (hard coat) disclosed in the experimental section of the patent application WO 2010/109154, with an antireflection coating and with the anti-smudge coating disclosed in the experimental section of patent application WO 2010/109154.

The layers of the antireflection coating were deposited, without heating the substrates, by vacuum evaporation optionally, when specified, assisted during the deposition by a beam of oxygen and possibly argon ions (evaporation source: electron gun).

The vacuum deposition reactor was a Leybold LAB 1100+ machine equipped with an electron gun for the evaporation of the precursor materials, with a thermal evaporator, with a KRI EH 1000 F ion gun (from Kaufman & Robinson Inc.) for use in the preliminary phase of (IPC) preparation of the surface of the substrate by argon ion bombardment and in the ion-assisted deposition (IAD) of the layer A or of other layers, and with a system for introducing liquid, which system was used when the precursor compound of the layer A was a liquid under standard temperature and pressure conditions (the case of TMCTS). This system comprises a reservoir containing the liquid precursor compound of the layer A, resistive heaters for heating the reservoir, tubes connecting the reservoir of liquid precursor to the vacuum deposition machine, and a vapor flowmeter from MKS (MKS1150C), raised to a temperature of 30-150° C. during its use, depending on the flow rate of the vaporized precursor, which preferably varied from 10 to 50 sccm. The precursor vapor exited from a tube inside the machine, at a distance of about 30 cm from the ion gun. Flows of oxygen and optionally of argon were introduced into the ion gun. Preferably, neither argon or any other noble gas is introduced into the ion gun.

The layers A according to the invention were formed by evaporation under ion bombardment of TMCTS compound.

The thickness of the deposited layers was controlled in real time by means of a quartz microbalance. Unless otherwise indicated, the thicknesses mentioned are physical thicknesses. A number of samples of each eyeglass were prepared.

2. Operating Modes

The method used to produce optical articles according to the invention comprised introducing the substrate coated with the primer coating and the anti-abrasion coating defined above into the vacuum deposition chamber; a step of preheating the vaporizer, tubes and the vapor flowmeter to the chosen temperature (~20 min); a primary pumping step; then a secondary pumping step lasting 400 seconds and allowing a secondary vacuum to be obtained (~$2 \times 10^{-5}$ mbar, pressure read from a Bayard-Alpert gauge); a step of activating the surface of the substrate with a beam of argon ions (IPC: 1 minute, 100 V, 1 A, the ion gun being stopped at the end of this step); then deposition by evaporation of the following inorganic layers using the electron gun until the desired thickness was obtained for each layer:

a 20 nm-thick $ZrO_2$ layer,
a 25 nm-thick $SiO_2$ layer,
a 80 nm-thick $ZrO_2$ layer, and
a 6 nm-thick electrically conductive ITO layer deposited with oxygen-ion assistance.

The layer A was then deposited on the ITO layer in the following way.

The ion gun was then started with argon, oxygen was added in the ion gun with a set flow rate (20 sccm), the flow of argon was cut, the desired anode current (3 A) was input and the TMCTS compound was introduced into the chamber (flow rate set to 20 sccm). (Summary of the deposition conditions (flow rates): TMCTS: 20 sccm; Ar: 0 sccm; and $O_2$: 20 sccm; current 3 A).

Generally, the process according to the invention is carried out with oxygen ($O_2$) in the ion gun, in the absence of noble gas introduced into the ion gun.

The TMCTS compound supply was stopped once the desired thickness had been obtained, then the ion gun was turned off.

In example 1, an anti-smudge coating layer (top coat) based on Optool DSX™ from Daikin and of about 5 nm was deposited directly on an 85 nm-thick layer A that formed the external layer of the antireflection coating.

Lastly, a venting step was carried out.

Comparative example 1 differs from the stack according to the invention in that the layer A is replaced with a silica layer of the same thickness (85 nm).

Comparative example 2 differs from the stack according to the invention in that the layer A is replaced by a layer of the same thickness (85 nm) obtained under the same conditions by evaporating, under ion bombardment, the compound OMCTS (octamethylcyclotetrasiloxane, which possesses no Si-hydrolyzable group bond) provided by the company ABCR, in place of the compound TMCTS. The article of comparative example 2 is in accordance with those forming the subject matter of patent application PCT/FR 12053092.

3. Characterizations

Abrasion resistance was evaluated by determining Bayer ASTM (Bayer sand) values for substrates coated with the antireflection coating and anti-smudge coating, using the methods described in patent application WO 2008/001011 (standard ASTM F 735.81). The higher the value obtained in the Bayer test, the higher the resistance to abrasion. Thus, the Bayer ASTM (Bayer sand) value was deemed to be good when it was higher than or equal to 3.4 and lower than 4.5 and excellent for values of 4.5 or more.

The critical temperature of the article was measured in the way indicated in patent application WO 2008/001011, 24 hours after the preparation of this article.

The bending resistance test allowed the capacity of an article having a curvature to undergo a mechanical deformation to be evaluated. This test was carried out on an initially spherical lens that was trimmed to the shape of a rectangle of 50×25 mm size. The forces applied in this test were representative of the forces applied at an optician's when fitting the glass, i.e. when the glass is "compressed" in order to be inserted into a metal frame. This test used an Instron machine to controllably deform the eyeglass, light-emitting diodes (LEDs) to illuminate the eyeglass, a video camera and an image-analyzing software package. The coated eyeglass was compressed by the Instron machine, by applying forces exerted along the axis of the main length of the trimmed eyeglass until cracks appeared, perpendicular to the movement direction, in the antireflection coating, which cracks were detected by image analysis in transmission. The result of the test was the critical deformation D in mm that the eyeglass can experience before cracks appear, see FIG. 1. This test was carried out one month after the eyeglasses had been produced. The higher the value of the deformation, the better the resistance to the applied mechanical deformation.

Generally, interference coatings according to the invention have critical deformation values ranging from 0.7 to 1.2 mm, preferably from 0.8 to 1.2 mm and more preferably from 0.9 to 1.2 mm.

The possible presence of cosmetic defects in the optical articles (articles according to the invention or comparative articles) was evaluated visually under an arc lamp (high-intensity lamp), after storage of the articles under tropical conditions in an "environmental" chamber regulated to 40° C. with 80% relative humidity at atmospheric pressure, and for a set length of time (t0+1 week or t0+1 month, the reference time t0 corresponding to 1 day after preparation of the articles). The expression "atmospheric pressure" is understood to mean a pressure of 1.01325 bar. These storage conditions allowed the optical articles to be prematurely aged and the possible appearance of cosmetic defects to be accelerated. The defects visible under the arc lamp took the form of spots or small filaments. These were localized optical defects. Although the most pronounced were visible to the naked eye in reflection at a grazing angle, observation thereof was facilitated by use of an arc lamp.

The adhesion test allowed the adhesive properties of the coating to be evaluated; it consisted in dipping the article into warm water and then stressing its surface mechanically. The higher the result obtained the better the adhesion.

The ink test allowed the performance of the anti-smudge coating to be evaluated. This test consisted in drawing a line with a No. 500 "magic ink" felt tip from Teranishi Chemical Industries Ltd, and in then evaluating the trace left on the eyeglass. If the ink rapidly retracted (<3 s) into small droplets, the result was considered to be a "pass". If the trace was continuous or contained continuous intervals, the result was considered to be a "fail".

4. Results

The tables below indicate for each of the examples and comparative examples the results of the tests to which the prepared articles were subjected.

| Example | Bayer sand | Critical temperature (° C.) | Adhesion test | Bending resistance test, deformation in mm before cracking | Ink test |
|---|---|---|---|---|---|
| 1 | 6 | 110 | 4.9 | 0.9 | pass |
| Comparative 1 | 4.5 | 70 | 5 | 0.6 | pass |
| Comparative 2 | 7.5 | 100 | 4.3 | 0.9 | fail |

Possible Presence of Cosmetic Defects

| Example | t0 (ambient temperature and humidity) | t0 + 1 week of tropical storage | t0 + 1 month of tropical storage |
|---|---|---|---|
| 1 | no | no | yes for 1 eyeglass in 2 |
| Comparative 1 | no | no | no |
| Comparative 2 | slight | yes | yes |

The article according to the invention has a better critical temperature and exhibits a significant improvement in how far it can be bent before cracks appear, relative to comparative example 1. These improvements are directly attributable to the presence of a layer A in the antireflection stack. It will be noted that it is not necessary for all the layers of the antireflection coating to be layers of organic nature, like the layer A, to obtain an improvement in the behavior of the product with respect to thermomechanical stresses.

The article according to the invention possesses an anti-smudge coating that has a higher performance than that of comparative example 2 and a performance equal to the anti-smudge coating deposited on a silica layer (comparative example 1), as revealed by the ink test, while preserving good mechanical properties. It will be noted that the use of other precursors such as hexamethyldisiloxane, decamethyltetrasiloxane or decamethylcyclopentasiloxane, which like OMCTS do not possess Si-hydrolyzable group bonds, lead to anti-smudge coating performances poorer than those obtained using a layer A according to the invention. Furthermore, the article according to the invention has a limited tendency to develop cosmetic defects over time, whereas that of comparative example 2 exhibits such defects a relatively short time after its preparation.

The invention claimed is:
1. An article comprising a substrate having at least one main surface coated with a layer A making direct contact with a hydrophobic external coating B, wherein the atomic percentage of carbon atoms in layer A ranges from 8 to 25%, and layer A is obtained by depositing, under an ion beam, activated species originating from at least one compound C, in gaseous form, comprising in its structure:
   at least one carbon atom;
   at least one hydrogen atom; and
   at least one Si—X group, where X is a hydroxy group or a hydrolyzable group chosen from the groups H, halogen, alkoxy, aryloxy, acyloxy, —NR$^1$R$^2$ where R$^1$ and R$^2$ designate independently a hydrogen atom, an alkyl group or an aryl group, and —N(R$^3$)—Si where R$^3$ designates an alkyl group or an aryl group;
said compound C being neither tetramethyldisiloxane, nor tetraethoxysilane, nor vinylmethyldiethoxysilane, nor hexamethylcyclotrisilazane and said layer A not being formed from inorganic precursor compounds, wherein the article is further defined as an ophthalmic lens.

2. The article as claimed in claim 1, wherein the ion beam is emitted by an ion gun.

3. The article as claimed in claim 1, wherein the compound C contains at least one Si—C bond.

4. The article as claimed in claim 1, wherein the silicon atom of the group Si—X is directly bonded to at least one carbon atom.

5. The article as claimed in claim 1, wherein the compound C contains at least one group of formula:

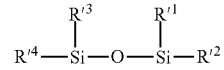

where R$^{t1}$ to R$^{t4}$ independently designate alkyl, vinyl or aryl groups or a group X, one at least of R$^{t1}$ to R$^{t4}$ designating a group X, X being such as defined in claim 1.

6. The article as claimed in claim 1, wherein the compound C is a compound of formula:

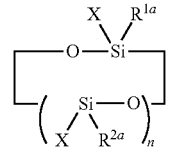

where X is such as defined in claim 1, n designates an integer ranging from 2 to 20 and R$^{1a}$ and R$^{2a}$ represent independently an alkyl, vinyl or aryl group or a hydrolyzable group.

7. The article as claimed in claim 1, wherein the layer A has a thickness ranging from 20 to 150 nm.

8. The article as claimed in claim 1, wherein the group Si—X is an Si—H group.

9. The article as claimed in claim 1, wherein the layer A has a refractive index lower than or equal to 1.55.

10. The article as claimed in claim 9, wherein the layer A is the external layer of a multilayer interference coating.

11. The article as claimed in claim 10, wherein the interference coating is an antireflection coating.

12. The article as claimed in claim 10, wherein the interference coating contains low refractive index layers having a refractive index lower than or equal to 1.55 and in that all these low refractive index layers are inorganic in nature except for the layer A.

13. The article as claimed in claim 10, wherein all the layers of the interference coating are inorganic in nature, except for the layer A.

14. The article as claimed in claim 1, wherein the silicon atom of the group Si—X is not bonded to more than two non-hydrolyzable groups.

15. The article as claimed in claim 4, wherein the silicon atom of the group Si—X is directly bonded to at least one alkyl group.

16. A process for manufacturing the article of claim 1, comprising at least the following steps:
   providing an article comprising a substrate having at least one main surface;
   depositing on said main surface of the substrate a layer A, wherein the atomic percentage of carbon atoms in layer A ranges from 8 to 25%;
   depositing directly on said layer A a hydrophobic external coating B;
   obtaining an article comprising a substrate having a main surface coated with said layer A making direct contact with the hydrophobic external coating B, said layer A having been obtained by depositing, under an ion beam, activated species originating from at least one compound C, in gaseous form, comprising in its structure:
   at least one carbon atom;
   at least one hydrogen atom; and
   at least one Si—X group, where X is a hydroxy group or a hydrolyzable group chosen from the groups H, halogen, alkoxy, aryloxy, acyloxy, —$NR^1R^2$ where $R^1$ and $R^2$ designate independently a hydrogen atom, an alkyl group or an aryl group, and —$N(R^3)$—Si where $R^3$ designates an alkyl group or an aryl group;
   said compound C being neither tetramethyldisiloxane, nor tetraethoxysilane, nor vinylmethyldiethoxysilane, nor hexamethylcyclotrisilazane and said layer A not being formed from inorganic precursor compounds, wherein the article is further defined as an ophthalmic lens.

17. The article as claimed in claim 1, wherein layer A is deposited without plasma assistance at the substrate level.

18. The process as claimed in claim 16, wherein layer A is deposited without plasma assistance at the substrate level.

19. The article as claimed in claim 1, wherein the atomic percentage of oxygen atoms in layer A ranges from 20 to 60%.

20. The article as claimed in claim 1, wherein the atomic percentage of oxygen atoms in layer A ranges from 35 to 45%.

21. The article as claimed in claim 1, wherein compound C further comprises at least one nitrogen atom and/or at least one oxygen atom.

22. The process as claimed in claim 16, wherein compound C further comprises at least one nitrogen atom and/or at least one oxygen atom.

* * * * *